Oct. 1, 1968　　　　M. S. McGEHEE　　　　3,403,562
VOLUMETRIC COMPENSATOR FOR TEMPERATURE CHANGES
Filed Jan. 31, 1967
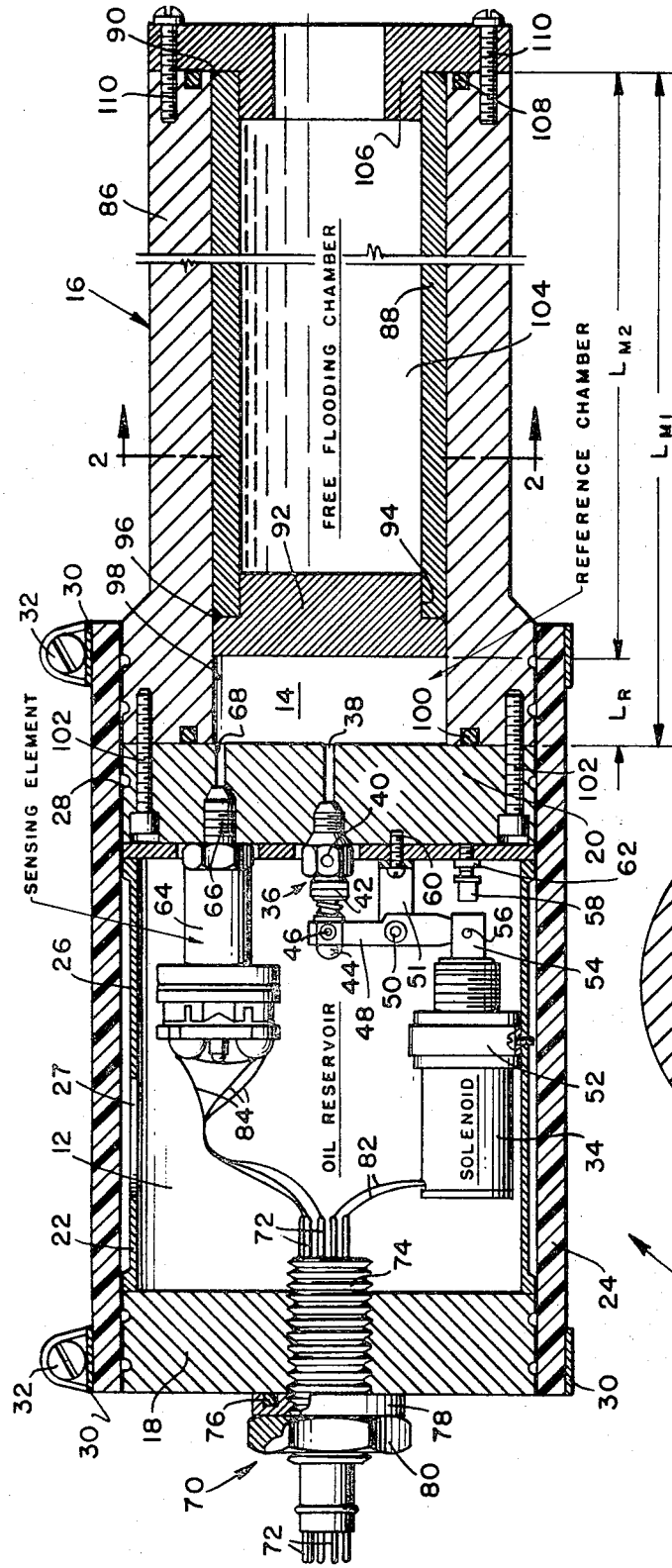
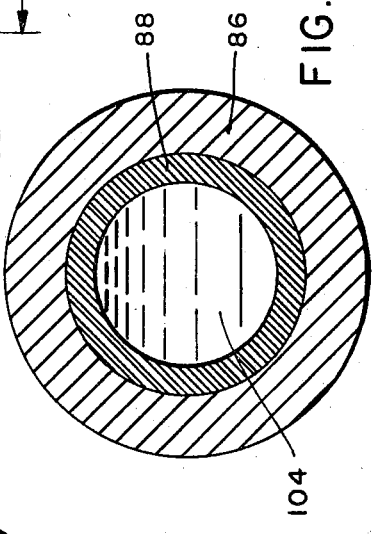
INVENTOR.
MAURICE S. McGEHEE
BY
ATTORNEY.

United States Patent Office 3,403,562
Patented Oct. 1, 1968

3,403,562
VOLUMETRIC COMPENSATOR FOR
TEMPERATURE CHANGES
Maurice S. McGehee, San Diego, Calif., assignor, by mesne assignments, to the United States of America as represented by the Secretary of the Navy
Filed Jan. 31, 1967, Ser. No. 613,044
10 Claims. (Cl. 73—393)

ABSTRACT OF THE DISCLOSURE

The present invention relates to a volumetric compensator for temperature changes which can be used for varying the volume of a chamber which contains a fluid so that there will be no change in pressure of the fluid when the fluid volumetrically changes due to a temperature variation. The compensator may include a pair of bodies which are composed of dissimilar metals having different coefficients of expansion so that upon a temperature change the bodies will cause a volumetric change which can be used to offset the volumetric change of the fluid within the chamber.

---

The invention described herein may be manufactured and used by or for the Government of the United States of America for governmental purposes without the payment of any royalties thereon or therefor.

It is well known that fluids have a large coefficient of expansion in contrast to solid materials, such as metals. Accordingly, when fluids are contained within a metallic container a large pressure differential will occur upon a slight temperature change unless some sort of relief valve is provided. Differential pressure gages often employ a chamber which is filled completely with a fluid for providing a reference pressure from which an ambient pressure can be compared. Some differential pressure gages are employed in an environment where there is no material temperature change or if the temperature change is significant calculations are made to offset the pressure variations within the reference chamber due to temperature changes.

The differential pressure gage, with a reference pressure chamber, has been found to be very desirable for use in combination with ocean topographical equipment which is towed near the ocean floor. This equipment uses sonar techniques and the pressure gage provides indications of depth changes of the equipment from an operating level which can be used to correct the sonar depth indications. Often this topographical equipment is towed at depths as great as 15,000 feet and is subjected to marked temperature variations. These temperature variations, if unaccounted for, will introduce large errors in the reference pressure in the chamber since the fluid in the chamber will change volumetrically more than the material forming the chamber.

The present invention provides a unique compensator for offsetting pressure changes of the fluid due to temperature variations within the water. The compensator may include a pair of bodies which are composed of dissimilar materials having different coefficients of expansion. The bodies, which may be metallic, may be fixed with respect to one another at one location and free to move with respect to one another at other locations so as to cause a volumetric change upon the occurrence of a temperature variation. When this volumetric change is communicated to the reference chamber the pressure change of the fluid within the chamber due to a temperature variation can be offset so that no pressure differential is realized when a temperature variation occurs.

In order to completely offset the pressure change of a fluid within a chamber due to a temperature variation the volumes of the metallic bodies in the compensator and the volume of the fluid should be related according to their coefficients of expansion so that the differential of expansion of the metallic bodies offsets the expansion of the fluid. This relationship may be represented by a formula wherein $$V_R = \frac{V_{M1}B_{M1} - V_{M2}B_{M2}}{B_R}$$

where:

$V_R$ equals the volume of the fluid within the reference chamber,
$B_R$ equals the coefficient of expansion of the fluid,
$V_{M1}$ equals the volume of one of the bodies,
$B_{M1}$ equals the coefficient of expansion of said one of the bodies,
$V_{M2}$ equals the volume of the other body, and
$B_{M2}$ equals the coefficient of expansion of the other body.

The dissimilar metallic bodies may be configured so as to cause a volumetric change which may be easily communicable to the reference chamber. In the preferred embodiment the volumetric change occurs directly within the reference chamber, however, in other embodiments it may be communicated to the reference chamber through a tube or conduit. The compensator may be utilized in other applications such as where storage tanks are filled with a fluid and it is desirable that pressure changes of the fluid due to temperature variations be offset.

An object of the present invention is to provide a compensator for offsetting volumetric change of a fluid within a chamber due to a temperature variation.

Another object is to provide a compensator for offsetting volumetric change of a fluid within the chamber due to temperature variation wherein the compensator forms at least a portion of said chamber.

A further object is to provide a differential pressure gage employing a reference pressure chamber wherein pressure changes of a fluid within the chamber due to temperature variations are offset.

Other objects, advantages and novel features of the invention will become apparent from the following detailed description of the invention when considered in conjunction with the accompanying drawing wherein:

FIG. 1 is a longitudinal, cross sectional view through a differential pressure gage including the compensator; and FIG. 2 is a cross sectional view through the compensator along plane II—II.

Referring now to the drawing wherein like reference numerals designate like or similar parts throughout the several views, there is shown in FIG. 1 a differential pressure gage 10 which may be mounted on a deeply towed oceanographic topographical instrument (not shown) in any suitable manner so that it is exposed to the outside ocean environment. The pressure gage 10 may include an oil reservoir 12 and an oil reference chamber 14 which is in communication with the oil reservoir. The oil reservoir 12 may be formed by a pair of transverse cylinders 18 and 20 which are longitudinally spaced from one another by a reservoir tube 22 which has approximately the same diameter as the cylinders.

A tubular housing constructed of a flexible material, such as neoprene, may be utilized to clamp the cylinders 18 and 20, and the tube 22 to form the oil reservoir 12 as well as providing a pressure interface between the reservoir and the outside ocean pressure environment. The tube 22 may be slightly recessed at 26 intermediate its end and along its outer surface so as to form an annular space between the flexible housing 24 and the outer surface of the tube 22. An opening 27 within the tube 22 will then enable pressure changes in the annular space to be reflected within the oil reservoir as the housing 24 flexes in response to these pressure changes.

The clamping action of the housing 24 may be accomplished by providing the inner surface of the housing with inwardly extending ribs 28 which recess within annular depressions within the cylinders 18 and 20 along with annular band type connectors 30 which encircle the outer diameter of the housing and are drawn tight by bolt and nut combinations 32 (the nut of such combination not being shown). The cylindrical end pieces 18 and 20 and the tube 22 may be constructed of any suitable material such as stainless steel. The reference chamber 14 may be formed by the cylindrical member 20 and the compensator 16 which will be described in detail hereinafter.

It is the object of the reference chamber 14 to provide a reference pressure which can be compared with the ocean pressure within the oil reservoir 12. These pressure differentials will indicate the variations in depth of the topography instrument carrying the differential pressure gage so that corrected sonar depth indications may be used for mapping the topography characteristics of the ocean floor. The sonar indications and the differential pressure gage indications may be telemetered to a towing vehicle (not shown) over cables (not shown) along a tow line (not shown) which connects the vehicle to the topography instrument.

The means for setting the reference chamber 14 at a pressure which corresponds to a starting depth within the ocean and the means for sensing differential pressure changes between the reference chamber 14 and the oil reservoir 12 may be located within the oil reservoir. The means for setting the reference chamber 14 at a reference pressure may include a solenoid actuator 34 which cooperates with a valve 36 to selectively open and close the reference chamber 14 to the oil reservoir through a passageway 38 in the cylindrical member 20. The valve 36 may include a female element 40 having a central bore (not shown) and a male element 42 which operably seats within the female element 40 to close off the central bore. As shown in FIG. 1, the female element 40 may be threaded within the transverse cylinder 20 so that its bore is aligned with the passageway 38. The male element 42 of the valve may have a longitudinal extension 44 which is pivoted at 46 to an actuating lever 48 by any suitable means such as a pin. The actuating lever 48 in turn is pivoted at 50 by a pin which may be supported by a bracket 51 which is mounted to the transverse cylinder 20, one side of which is shown in FIG. 1.

The solenoid actuator 34 may be mounted to the inner wall of the tube 22 by any suitable means such as a semi-annular bracket 52 which is bolted to the inner wall of the tube, and may have a longitudinal plunger 54 which is pivotably connected at 56 to an opposite end of the actuating lever 48 by any suitable means such as a pin. Accordingly, when the solenoid actuator 34 is actuated the plunger 54 will be positioned as shown in the drawing and operate through the actuating lever 48 to close the valve 36 and thereby seal the reference chamber 14 from the oil reservoir 12. When the solenoid actuator 34 is not actuated the plunger 54 will be in a location to the right of that shown in FIG. 1 so as to open the valve 36 and communicate the reference chamber 14 with the oil reservoir 12. This movement to the right of the plunger 54 may be limited by a stop element 58. The stop element 58 may be threaded in an inner plate 60 which is bolted to an inner face of the cylinder 20. As shown, the stop element 58 may be adjustably secured at various limiting positions by a nut 62 which tightly engages the plate 60.

The means for sensing the differential pressure between the reference chamber 14 and the oil reservoir 12 may include a sensing element 64. This sensing element may have a longitudinal tubular projection 66 which is threaded within the annular cylinder 20 in alignment with a passageway 68 located in the cylinder 20. Accordingly, pressure within the referene chamber 14 will be reflected within the sensing element 64 and the sensing element will compare this pressure with the pressure in the oil reservoir 12 to provide a differential pressure indication. While many various types of sensing elements may be employed the one illustrated in the drawing is a Wiancko Model No. P2–1301 which utilizes bridge circuitry to indicate a pressure change.

Since the differential pressure gage 10 is normally towed at a considerable distance from the towing vehicle, it is desirable that telemetering techniques be employed for selectively actuating the solenoid actuator 34 and sensing the response from the sensing element 64. The electronic signals to actuate the solenoid actuator 34 and the signals from the sensing element 64 may be fed through electrical conductors (not shown) which extend along the tow cable to the towing vehicle. These electrical conductors may be operably connected to a five pin electrical connector 70 which, in turn, is electrically connected by wires within the oil reservoir 12 to the solenoid actuator 34 and the sensing element 64.

The connector 70 may include an externally threaded cylinder 74 which is threaded through the transverse cylinder 18. Pins 72 may extend through the cylinder 74 and beyond its ends for connection outside the reservoir to the electrical conductors to the towing vehicle and for connection within the oil reservoir to the solenoid actuator 34 and the sensing element 64. The threaded cylinder 74 of the connector may be sealed from the outside ocean environment by an O-ring 76 which is held in engagement against the outside surface of the transverse cylinder 18 by an outside plate 78 which in turn is held in snug engagement with the transverse cylinder 18 by a hexagonal flange which is integral with the cylinder 74. Wires 82 may then operatively connect a pair of the pins 72 to the solenoid actuator 34 so that the solenoid may be actuated by a signal from the towing vehicle and wires 84 may operatively connect three of the pins 72 to the sensing element 64 so as to indicate to the towing vehicle a pressure differential between the reference chamber 14 and the oil reservoir 12. The towing vehicle may be provided with a recorder (not shown) for recording these pressure differential indications.

As the differential pressure gage 10 is towed through the water it will be subjected to varying temperature conditions which will cause the oil within the reference chamber 14 to correspondingly change its volume. This volumetric change of the oil within the reference chamber 14 will introduce a pressure error which will be sensed by the sensing element 64 unless some means is provided to offset this error. The means for offsetting this error is the temperature compensator 16. As stated hereinabove, the pressure error is caused by large volumetric expansion of the oil within the reference chamber in contrast to the small volumetric expansion of the solid material which forms the chamber. For instance, if hydraulic jack fluid is used as the oil within the oil reservoir 12 and the reference chamber 14, the coefficient of expansion of the oil will be in the order of 600 parts per million (p.p.m.). In contrast, a steel constructed reference chamber has a coefficient of expansion of only about 30 p.p.m. The present invention has overcome this problem by providing a temperature compensator 16 which employs a pair of bodies composed of dissimilar materials having different coefficients of expansion and which cooperate with one another so as to provide a volumetric change communicating with the reference chamber which offsets undesirable volumetric changes of the oil within the reference chamber due to temperature variations.

In the preferred embodiment of the invention, as shown in FIG. 1, the volumetric change of the dissimilar bodies occurs directly within the reference chamber 14. The dissimilar bodies may comprise an outer tube 86, which is constructed of aluminum, and an inner tube 88 which is constructed of steel. The tubes 86 and 88 may be concentrically disposed with the tubes longitudinally slidable with respect to one another. The tubes 86 and 88 may be fixed together at a location along their lengths such as by an annular weld 90 located at their coextensive ends to the right in FIG. 1. Accordingly, a temperature change imposed upon the tubes 86 and 88 will cause the tube 88 to slide longitudinally with respect to the outer tube 86. This relative longitudinal movement of the tubes 86 and 88 will cause a volumetric change which will be reflected within the reference chamber 14.

In order to form the reference chamber 14 in cooperation with the transverse cylinder 20 the inner tube 88 may be shorter than the outer tube 86 and may be provided with a cylindrical end piece 92 which forms one side of the reference chamber 14. The end piece 92 may be connected to the inner tube 88 by providing the end piece with an annular recess 94 for receiving the tube, and an annular weld 96 may join the end piece 92 to the inner tube 88. The outer tube 86 may extend to the left beyond the end piece 92 and may make sealing engagement with the cylindrical member 20 so as to form an annular portion 98 of the reference chamber 14. The outer tube 86 may be sealed against the cylindrical member 20 by an O-ring 100 which is recessed within the left end of the tubular member 86, and the tubular element 86 may be tightly secured to the cylindrical member 20 by a series of bolts 102 which are threaded within the tube 86.

The temperature compensator 16 is highly responsive to temperature variations by providing the right end of the inner tube 88 with an opening for allowing sea water to flood within a chamber 104. If desired, the right end of the compensator 16 may be provided with an annular end piece 106 which is sealed against the outer tube 86 by an O-ring 108 and which is securely fixed against the end of this tube by bolts 110. This annular end piece 106 may in turn be utilized for mounting the differential pressure gage 10 to the towed topographical instrument (not shown).

In order to fully offset the pressure variation of the oil within the reference chamber 14 due to temperature variation, the volumes of the tubes 86 and 88 and the volume of the oil within the reference chamber 14 must be appropriately related according to their respective coefficients of expansion. Assuming $V_R$ to represent the volume of the oil within the reference chamber 14, $V_{M1}$ to represent the volume of the material of the outer tube 86 and $V_{M2}$ to represent the volume of the material of the inner tube 88, then $$V_R = \frac{V_{M1}B_{M1} - V_{M2}B_{M2}}{B_R} \quad (1)$$

where $B_{M1}$=the coefficient of expansion of the material comprising the outer tube 86;
$B_{M2}$=the coefficient of expansion of the material of the inner tube 88; and
$B_R$=the coefficient of expansion of the oil within the reference chamber 14.

In any configuration of the tubes 86 and 88 wherein they form a place for volumetric change this formula may be used to design the volumes of the tubes 86 and 88 as well as the volume of the reference chamber 14. Since the end piece 92 normally forms a small portion of the inner part the compensator 16, and the flared portion 109 forms a small portion of the outer tube 86, these portions can be ignored to simplify the calculations. In the same manner the oil within the passageways 38 and 68 may be ignored since they contain a very small portion of the oil within the reference chamber 14.

In designing the appropriate lengths of the outer tube 86 and the inner tube 88 in combination with the end piece 92, a simple length relationship may be formulated if the portions of the components mentioned hereinabove are ignored. For instance, if the oil used is hydraulic jack fluid the coefficient of expansion is approximately 600 p.p.m., if the outer tube 86 is aluminum the coefficient of expansion is approximately 75 p.p.m., and if the inner tube 88 and the end piece 92 are constructed of steel the coefficient of expansion is approximately 30 p.p.m. It is to be noted that the inner tube 88 must have a lower coefficient of expansion than the outer tube 86 so that the differential expansions between the two bodies will offset the volumetric expansion of the oil within the reference chamber 14. This relationship in terms of length of the components may be represented by $$B_R L_R = B_{M1} L_{M1} - B_{M2} L_{M2} \quad (2)$$

where $B_R$=the coefficient of expansion of the oil within the reference chamber 14.
$B_{M1}$=the coefficient of expansion of the material of tube 86
$B_{M2}$=the coefficient of expansion of the material of tube 88
$L_R$=the length of the reference chamber 14
$L_{M1}$=the length of the outer tube 86 and
$L_{M2}$=the length of the inner tube 88.

But $$L_{M1} = L_R + L_{M2} \quad (3)$$

Therefore substituting Formula 3 in Formula 2

$$B_R L_R = B_{M1}(L_R + L_{M2}) - B_{M2} L_{M2} \quad (4)$$

Then $$B_R L_R = B_{M1} L_R + B_{M1} L_{M2} - B_{M2} L_{M2} \quad (5)$$

$$B_R L_R - B_{M1} L_R = B_{M1} L_{M2} - B_{M2} L_{M2} \quad (6)$$

$$L_R(B_R - B_{M1}) = L_{M2}(B_{M1} - B_{M2}) \quad (7)$$

$$L_{M2} = L_R \frac{B_R - B_{M1}}{B_{M1} - B_{M1}} \quad (8)$$

Ae an example in utilizing Formula 8 to find the appropriate length relationships of the reference chamber 14, the outer tube 86 and the inner tube 88 with the coefficients of expansion assumed hereinabove $$L_{M2} = L_R \frac{600 - 75}{75 - 30}$$

and $$L_{M2} = 11.7 L_R$$

Accordingly, if it is assumed that the length of the reference chamber $L_R$ is to be 1.7″ then $$L_{M2} = 11.7 \times 1.7$$

or $$L_{M2} = 19.9''$$

If any tolerance is provided between the tubes 86 and 88 this will, of course, provide a volume which must be considered in combination with the reference chamber 14 in which instance the length of the reference chamber will be shortened accordingly.

In the operation of the present invention the differential pressure gage 10 is towed at a level where it is desired to obtain topographic information of the ocean bottom. At this level the solenoid actuator 34 is actuated to close the reference chamber 14 to the oil reservoir 12 so that the reference chamber 14 will reflect a reference pressure which is equal to the ocean pressure at said level. Variations in depth of the differential pressure gage 10 from this reference level will cause a corresponding pressure change within the oil reservoir 12. The differential pressure between the oil reservoir and the reference chamber 14 due to this change in depth from the operating level will be sensed by the sensing element 64 and indicated to instruments aboard the towing vehicle. Pressure errors of the fluid within the reference chamber 14 due to temperature variations in the ocean are offset by the volumetric changes of the compensator 16. For instance, if the temperature increases and the volume of the fluid within the reference chamber 14 correspondingly increases the tubes 86 and 88 will slide with respect to one another to enlarge the reference chamber 14 and offset the pressure increase of the fluid therein. Accordingly, the normal pressure error which accompanies temperature changes within the ocean environment will be obviated by the compensator 16.

Obviously many modifications and variations of the present invention are possible in the light of the above teachings. It is therefore to be understood that within the scope of the appended claims the invention may be practiced otherwise than as specifically described.

I claim:

1. A volumetric compensator for temperature changes comprising:
   means providing a reference chamber having a volume $V_R$ and capable of containing a fluid having a coefficient of thermal expansion of $B_R$;
   means communicating with said chamber for opening and closing said chamber to an outside pressure environment;
   means communicating with said chamber for sensing fluid pressure within said reference chamber; and
   means communicating with said chamber for volumetrically varying the chamber to offset pressure changes of the fluid due to the fluid's volumetric variation upon the occurrence of a temperature change;
   the chamber volumetrically means including:
      a pair of longitudinal engaging concentric tubes which are fixed with respect to one another at a location along their lengths and are free to slide longitudinally with respect to one another except at their location of fixation;
      the inside tube being open to the outside environment; and
      said tubes being dissimilar metals so that upon a change in the temperature of the outside ambient environment the tubes slide longitudinally with respect to one another.

2. A compensator as claimed in claim 1 wherein:
   the coefficient of expansion of the inner tube is less than the coefficient expansion of the outer tube.

3. A compensator as claimed in claim 1 wherein:
   the means providing said reference chamber includes said dissimilar metals.

4. A compensator as claimed in claim 1 wherein:
   one of said metals has a volume of $V_{M1}$ and a coefficient of thermal expansion of $B_{M1}$ and the other of said metals having a volume of $V_{M2}$ and a coefficient of thermal expansion of $B_{M2}$; and
   the volume $V_R$ of the reference chamber being substantially equal to
   $$\frac{V_{M1}B_{M1} - V_{M2}B_{M2}}{B_R}$$

5. A compensator as claimed in claim 1 wherein:
   the inside tube extends beyond the outside tube to form a portion of said chamber.

6. A compensator as claimed in claim 5 wherein:
   one of said metals has a volume of $V_{M1}$ and a coefficient of thermal expansion of $B_{M1}$ and the other of said metals having a volume of $V_{M2}$ and a coefficient of thermal expansion of $B_{M2}$; and
   the volume $V_R$ of the reference chamber being substantially equal to
   $$\frac{V_{M1}B_{M1} - V_{M2}B_{M2}}{B_R}$$

7. A compensator as claimed in claim 6 wherein:
   the coefficient of expansion of the inner tube is less than the coefficient of expansion of the outer tube.

8. In combination with a deep ocean differential pressure gage of the type having a reference chamber, a volumetric compensator for temperature changes comprising:
   a pair of longitudinally engaging concentric tubes which are longitudinally slidable with respect to one another;
   said tubes being constructed of dissimilar metals with the coefficient of expansion of the inner tube being less than the coefficient of expansion of the outer tube;
   said tubes being fixed to one another at a pair of ends and slidably free at all other locations along their lengths;
   said tubes being open and communicable with the outside environment at their fixed ends so that upon a change in outside temperature the tubes will slide with respect to one another; and
   said tubes being closed at their free pair of ends and said inner tube being shorter than the outer tube to provide a space which forms said reference chamber.

9. A combination as claimed in claim 8 wherein:
   the volume $V_R$ of the reference chamber is substantially equal to
   $$\frac{V_{M1}B_{M1} - V_{M2}B_{M2}}{B_R}$$
   where
   $V_{M1}$ = the volume of the material of the outer tube,
   $B_{M1}$ = the coefficient of expansion of the material of the outer tube,
   $V_{M2}$ = the volume of the material of the inner tube,
   $B_{M2}$ = the coefficient of expansion of the material of the inner tube, and
   $B_R$ = the coefficient of expansion of the fluid within said reference chamber.

10. A combination as claimed in claim 8 wherein:
    the coefficient of expansion $B_R$ of the fluid within the reference chamber is substantially equal to
    $$\frac{B_{M1}L_{M1} - B_{M2}L_{M2}}{L_R}$$
    where
    $B_{M1}$ = the coefficient of expansion of the material of the outer tube,
    $L_{M1}$ = the length of the outer tube,
    $B_{M2}$ = the coefficient of expansion of the material of the inner tube,
    $L_{M2}$ = the length of the inner tube, and
    $L_R$ = the length of the reference chamber.

References Cited

UNITED STATES PATENTS

| | | | |
|---|---|---|---|
| 2,487,213 | 11/1949 | Bender | 92—1 XR |
| 3,050,085 | 8/1962 | Reese. | |
| 3,067,614 | 12/1962 | Rich | 73—393 XR |
| 3,140,613 | 7/1964 | Hasegawa | 73—393 XR |

S. CLEMENT SWISHER, *Acting Primary Examiner.*

DONALD O. WOODIEL, *Assistant Examiner.*